United States Patent
Ahmad et al.

(10) Patent No.: US 11,224,926 B2
(45) Date of Patent: Jan. 18, 2022

(54) METHOD FOR PRODUCING A CAVITY IN A BLADE PLATFORM; CORRESPONDING BLADE

(71) Applicant: Siemens Energy Global GmbH & Co. KG, Munich (DE)

(72) Inventors: Fathi Ahmad, Kaarst (DE); Daniela Koch, Berlin (DE); Markus Lempke, Mülheim (DE); Thorsten Mattheis, Mülheim (DE); Axel Podschwadek, Gladbeck (DE); Radan Radulovic, Bochum (DE); Anne Weidenmüller, Düsseldorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 127 days.

(21) Appl. No.: 16/473,360

(22) PCT Filed: Jan. 10, 2018

(86) PCT No.: PCT/EP2018/050511
§ 371 (c)(1),
(2) Date: Jun. 25, 2019

(87) PCT Pub. No.: WO2018/134093
PCT Pub. Date: Jul. 26, 2018

(65) Prior Publication Data
US 2020/0141245 A1   May 7, 2020

(30) Foreign Application Priority Data
Jan. 23, 2017 (EP) .................................... 17152629

(51) Int. Cl.
*B23H 9/14*  (2006.01)
*B23H 9/10*  (2006.01)
(Continued)

(52) U.S. Cl.
CPC ................. *B23H 9/14* (2013.01); *B23H 1/00* (2013.01); *B23H 9/10* (2013.01); *B23K 26/389* (2015.10);
(Continued)

(58) Field of Classification Search
CPC .... F05D 2240/81; F05D 2230/12; F05D 5/18; B23H 1/00; B23H 9/14; B23H 9/10;
(Continued)

(56) References Cited

U.S. PATENT DOCUMENTS 2,902,584 A * 9/1959 Ullmann .................. B23H 7/28
219/69.15
3,041,442 A     6/1962 Ullmann
(Continued)

FOREIGN PATENT DOCUMENTS

CN       1982655 A       6/2007
CN       103161513 A     6/2013
(Continued)

OTHER PUBLICATIONS

PCT International Search Report and Written Opinion of International Searching Authority dated Feb. 5, 2018 corresponding to PCT International Application No. PCT/EP2018/050511 filed Oct. 1, 2018.

*Primary Examiner* — Geoffrey S Evans (57) ABSTRACT

A method for producing a cavity in a blade platform of a blade, in particular of a turbine blade, as part of a blade-platform cooling system, wherein the method has the steps of: producing a first bore from a first platform lateral face in the direction of an opposite second platform lateral face, with a first opening in the first platform lateral face being created, and expanding the first bore in a fan-like manner by an electrical discharge machining method, in particular using a wire- or bar-form electrode, such that the first
(Continued)

opening, created in the first step, of the first bore represents the starting point of the fan-like expansion. A blade is produced in particular with such a method.

9 Claims, 6 Drawing Sheets

(51) Int. Cl.
  *B23K 26/40*    (2014.01)
  *B23K 26/382*   (2014.01)
  *B23H 1/00*    (2006.01)
  *F01D 5/18*    (2006.01)
  *B23K 103/18*   (2006.01)

(52) U.S. Cl.
  CPC .......... *B23K 26/40* (2013.01); *B23K 2103/26* (2018.08); *F01D 5/18* (2013.01); *F05D 2230/12* (2013.01); *F05D 2240/81* (2013.01)

(58) Field of Classification Search
  CPC .. B23K 26/40; B23K 26/389; B23K 2103/26; B23K 2101/001
  See application file for complete search history.

(56) References Cited

U.S. PATENT DOCUMENTS

| | | | |
|---|---|---|---|
| 3,719,569 A * | 3/1973 | Gosger | B23H 9/006 |
| | | | 205/666 |
| 4,104,503 A * | 8/1978 | Di Piazza | B23H 9/14 |
| | | | 219/69.15 |
| 5,313,038 A | 5/1994 | Kildea | |
| 9,109,454 B2 * | 8/2015 | Ellis | F01D 5/187 |
| 2002/0098078 A1 * | 7/2002 | Beeck | F01D 5/187 |
| | | | 415/1 |
| 2007/0077144 A1 | 4/2007 | Lee et al. | |
| 2007/0128034 A1 | 6/2007 | Lee et al. | |
| 2011/0070096 A1 | 3/2011 | Wei et al. | |
| 2011/0217180 A1 | 9/2011 | Hada et al. | |
| 2012/0034102 A1 * | 2/2012 | Boyer | F01D 5/187 |
| | | | 416/97 R |
| 2013/0156549 A1 | 6/2013 | Maldonado | |

FOREIGN PATENT DOCUMENTS

| | | |
|---|---|---|
| JP | S5264096 A | 5/1977 |
| JP | 2000000720 A | 1/2000 |
| JP | 2000186503 A | 7/2000 |

* cited by examiner

METHOD FOR PRODUCING A CAVITY IN A BLADE PLATFORM; CORRESPONDING BLADE

CROSS REFERENCE TO RELATED APPLICATIONS

This application is the US National Stage of International Application No. PCT/EP2018/050511 filed Jan. 10, 2018, and claims the benefit thereof. The International Application claims the benefit of European Application No. EP17152629 filed Jan. 23, 2017. All of the applications are incorporated by reference herein in their entirety.

FIELD OF INVENTION

The present invention relates to a method for producing a cavity in a blade platform of a blade, in particular of a turbine blade, and to a blade having such a cavity.

BACKGROUND OF INVENTION

Turbine blades including their blade leaves and blade platforms are exposed to very high temperatures when used as intended in a gas turbine. Accordingly, they are normally cooled using a cooling fluid. In order to cool blade platforms, cavities must be formed in the latter, through which the cooling fluid used can be passed. Different methods are currently known for producing such cavities.

On the one hand, the cavities can be generated during the blade platform casting process itself, using corresponding casting cores. However, after the casting process, a blade platform necessarily has a large number of sometimes very large openings which are due to the requirement to fix the casting core inside the casting mold and are also required for subsequent removal of the casting material. After the casting material is removed, such openings are then usually sealed using a soldering or welding method or at least reduced in such a way that uncontrolled leakage of cooling fluid through the openings is prevented during the proper use of the turbine blade. However, there is a problem that turbine blades, including their platforms, are often produced from nickel-based super alloys which can be soldered and welded with difficulty, as a result of which it is often difficult to seal the openings.

Alternatively, cavities can also be introduced subsequently into already cast blade platforms, in particular using drilling and/or spark erosion methods. When producing relatively large cavities, as are required for proper cooling of a blade platform, however, these methods too are normally associated with the creation of relatively large openings which likewise need to be sealed by soldering or welding, as a result of which a similar problem results to when cavities are produced using casting.

In order to avoid the relatively large openings in blade platforms, it is known from US 2011/0070096A1 to guide electrodes which are curved in the shape an arc of a circle on a corresponding circular path through the platform of a blade and hence to produce cooling channels in the shape of an arc of a circle. However, there are disadvantages here that a complicated tool is provided which can be used specifically for this purpose, and the fact that it is not possible thereby to produce cooling channels or even cooling regions of any type or which can be adapted to local cooling requirements.

Furthermore, it is known from JP 2000-000720 A to bend inside a workpiece the electrode of an eroding machine, with the aid of a right-angled guide tube of the latter, such that undercuts can be eroded. Owing to the right-angled guide tube, relatively large feed openings result in the workpiece, as a result of which the problem of the undesirably large openings is also not solved thereby.

SUMMARY OF INVENTION

Starting from this prior art, an object of the present invention is to provide an alternative method of the type mentioned at the beginning which at least partially overcomes the above-described disadvantages.

In order to achieve this object, the present invention provides a method for producing a cavity in a blade platform of a blade, in particular of a turbine blade as part of a blade platform cooling system, wherein the method has the steps: a) producing a first bore starting from a first platform side surface in the direction of an opposite second platform side surface, generating a first opening in the first platform side surface, and b) widening the first bore in the manner of a fan by means of a spark erosion method, in particular using a rigid electrode in the form of a wire or rod, in such a way that the first opening, generated in step a), of the first bore represents the starting point of the fan-like widening.

The bore produced in step a) can in principle be produced using any desired drilling method, wherein a spark erosion method is advantageously used here too. The fan-like widening of the first bore which according to the invention follows in step b) in such a way that the first opening, generated in step a), of the first bore represents the starting point of the fan-like widening results in it being possible for a relatively large cavity to be generated, while the first opening of the first bore is widened only slightly, if at all. Such a small bore can be sealed relatively easily even in the case of materials which are hard to solder or weld. However, owing to its small size, it can also remain unsealed and in particular serve as a cooling fluid outlet opening for the cooling fluid passed through the cavity.

According to a first embodiment of the method according to the invention, in step b), starting from the first opening of the first bore, a plurality of further bores are generated which each have a predetermined angular offset with respect to one another, wherein adjacently arranged bores overlap each other in some regions. In this way, starting from the first opening of the first bore, a plurality of bores which extend like the spokes of a wheel and are fluidically connected to one another are generated which together define a cavity.

According to an alternative embodiment of the method according to the invention, in step b, the rigid electrode inserted into the first opening of the first bore is pivoted or moved in a fan-like fashion in the manner of a windshield wiper. In this way, a cavity in the shape of an arc of a circle and hence also fan-like is produced.

The depth of the first bore and possibly the other bores advantageously in each case extend beyond an imaginary central plane between the first platform side surface and the second platform side surface. The cavity generated starting from the first opening accordingly extends over more than half of the blade platform width at a corresponding point.

According to an embodiment of the method according to the invention, a bore is produced which generates a second opening in the first platform side surface and/or in the second platform side surface and which extends, starting from this second opening, toward the opposite platform side surface, wherein the bore is widened in a fan-like fashion by means of a spark erosion method, in particular using a rigid wire electrode, in such a way that the second opening represents the starting point of the fan-like widening. The bore generated here can be generated at the same time as the bore produced in step a), by the bore generated in step a) taking the form of a through bore which extends from the first platform side surface to the opposite second platform side surface, in particular perpendicularly to the abovementioned central plane of the blade platform. Alternatively, the bore generated here can, however, also be introduced into the blade platform as a separate second bore starting from the second platform side surface. The bore is then widened in a fan-like fashion, in a similar manner to step b) by means of a spark erosion method, in particular using a rigid wire electrode, in such a way that the second opening represents the starting point of the fan-like widening.

As part of the fan-like widening, starting from the second opening generated in the second platform side surface or in the second platform side surface, a plurality of further bores are advantageously generated which each have a predetermined angular offset relative to one another, wherein adjacently arranged bores overlap one another in some regions. Alternatively, as part of the fan-like widening, the electrode inserted into the bore starting from the second opening can, however, also be pivoted in a fan-like fashion. Both variants have already been explained above, as a result of which they will not be explained again.

The depth of the bore or the bores advantageously each extend beyond an imaginary central plane between the second platform side surface and the first platform side surface such that the cavity generated starting from the second opening extends over more than half the blade platform width.

The fan-like widenings effected by the same and/or different platform side surfaces in particular define a common cavity by the bores introduced on both sides and the regions widened in a fan-like fashion intersecting or overlapping one another.

The blade platform is advantageously produced from a super alloy, in particular from a nickel-based super alloy.

The present invention for achieving the object mentioned at the beginning moreover provides a blade, in particular a turbine blade, having a blade leaf and at least one blade platform, in which at least one cavity is formed, connected to the blade leaf, wherein the at least one cavity forms part of a blade platform cooling system, characterized in that the cavity has either an essentially triangular or an essentially diamond-shaped or an essentially star-shaped outer contour. Outer contours of this type result in particular when the cavity is produced using the above-described method according to the invention.

At least one of the corner regions, formed by abutting side walls of the at least one cavity advantageously defines an opening in a platform side surface. Such an opening results automatically when the cavity is produced using the method according to the invention.

According to an embodiment of the present invention, the at least one cavity is fluidically connected to a blade leaf cavity which normally likewise represents part of a blade platform cooling system.

At least the blade platform is advantageously produced from a super alloy, in particular from a nickel-based super alloy.

BRIEF DESCRIPTION OF THE DRAWINGS

Other features and advantages of the present invention will become clear with the aid of the following description of different embodiments of blades and methods according to the invention with reference to the attached drawings, in which.

DETAILED DESCRIPTION OF INVENTION

Identical reference numerals refer below to identical or similar components.

FIGS. 1 to 5 show a blade 1, which is a turbine blade in the present case, to be more precise a turbine guide blade. The blade 1, which is produced as a single part from a super alloy, in particular from a nickel-based super alloy, comprises a blade leaf 2 and at least one blade platform 3 connected to the blade leaf 2.

Figure 1:
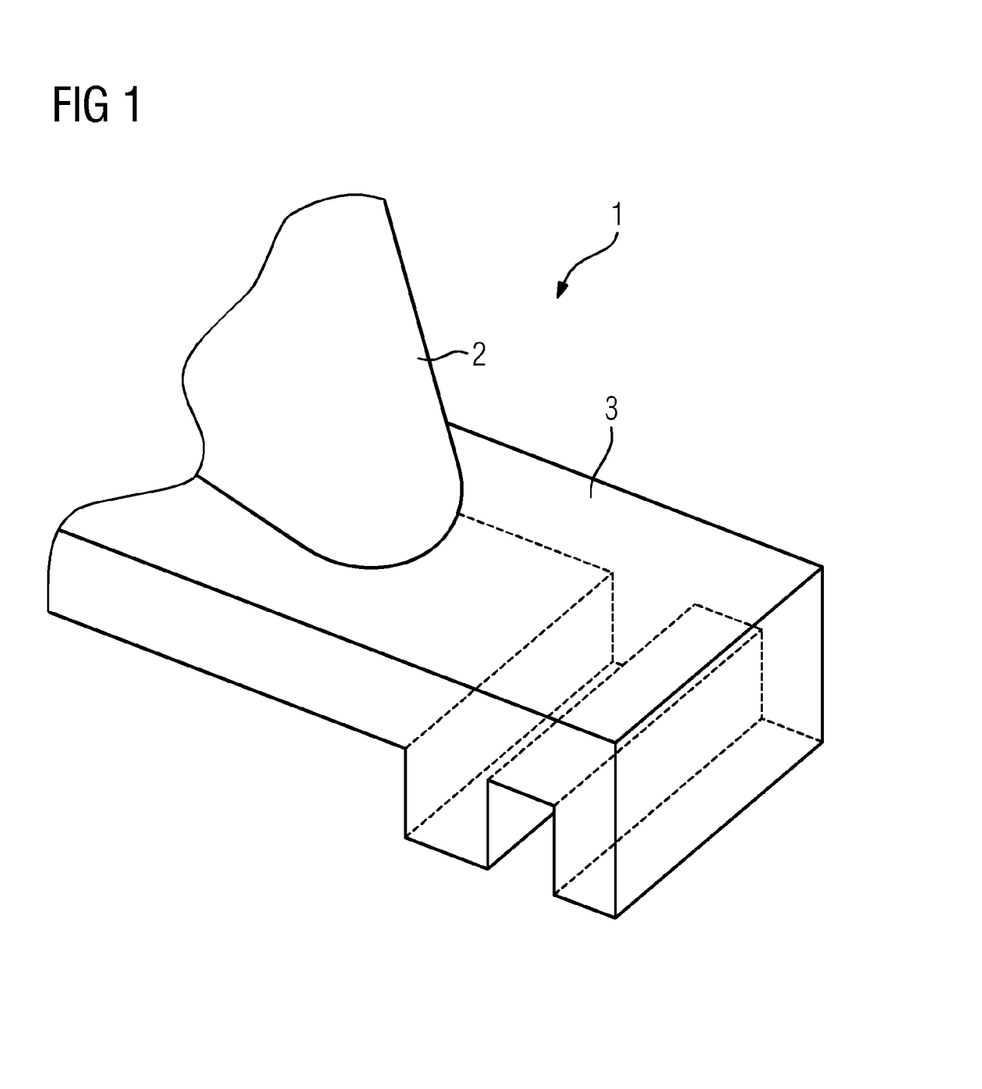
FIG. 1 is a schematic perspective partial view of a blade platform of a turbine blade into which it is intended to introduce a cavity as part of a blade platform cooling system, wherein the blade platform is shown to be transparent and the normally obscured lines are indicated in dashed lines.
Figure 2:
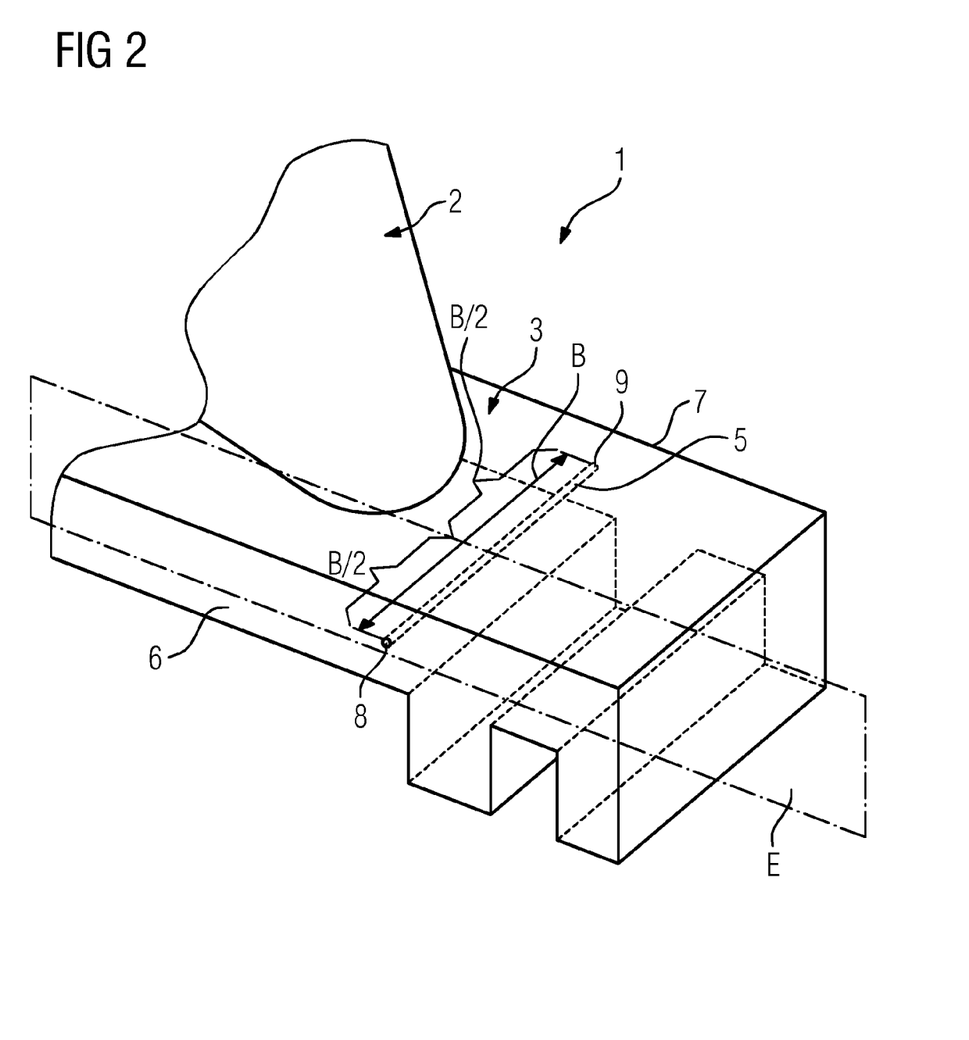
FIG. 2 is a view according to FIG. 1, which shows a state after a first method step of a method according to the invention has been performed.

In order to cool the blade platform 3, it is intended to introduce a cavity 4, which forms part of a blade platform cooling system, into the front region. For this purpose, in a first step, as shown in FIG. 2, a first bore 5 starting from a first platform side surface 6 toward an opposite second platform side surface 7 is produced, generating a first opening 8 in the first platform side surface 6 and a second opening 9 I the second platform side surface 7. In order to introduce the first bore 5, which in the present case extends at right angles to an imaginary central plane E between the first and the second platform side surface 6 and 7, any suitable drilling method can in principle be used. In the present case, a spark erosion method with a rigid electrode 10 in the form of a wire or rod is used.

Figure 3:
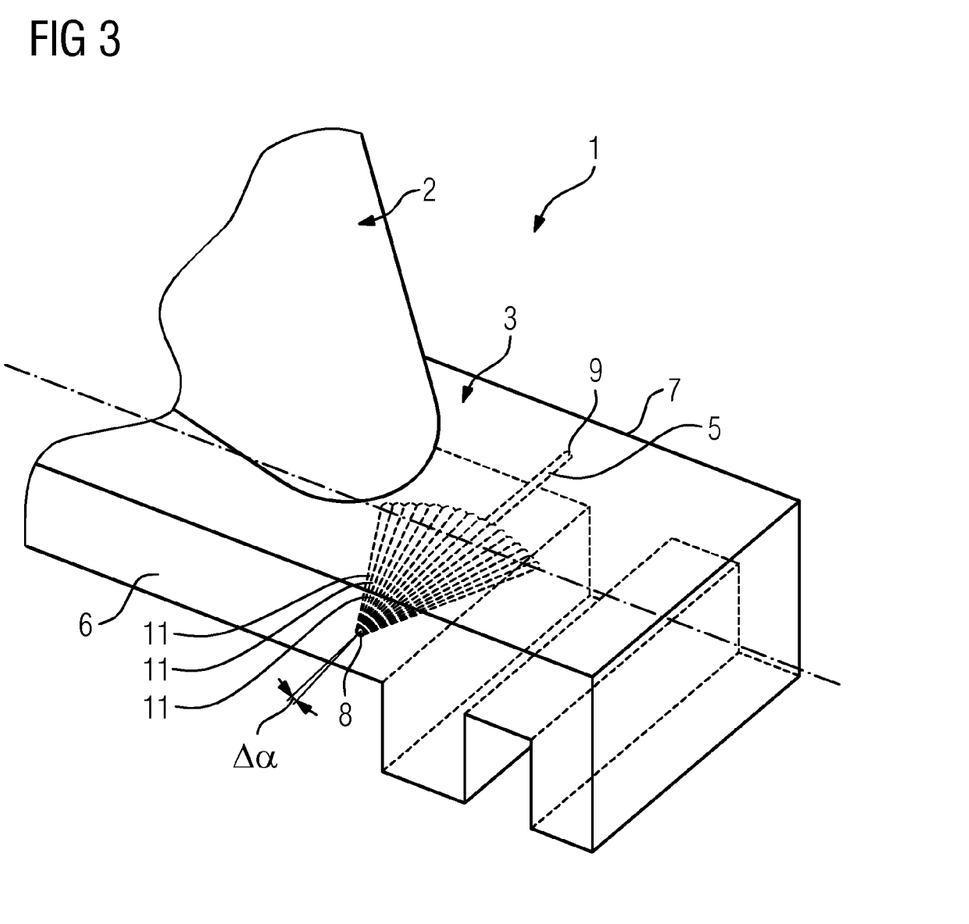
FIG. 3 is a view according to FIGS. 1 and 2, which shows a view after a second method step of the method according to the invention has been performed.

In a second step, the first bore 5 according to FIG. 3 is widened in a fan-like fashion in such a way that the first opening 8, generated in the first step, of the first bore 5 represents the starting point of the fan-like widening. For this purpose, starting from the first opening 8 of the first bore 5, a plurality of bores 11 is generated which each have a predetermined angular offset $\Delta\alpha$ with a magnitude of advantageously 0.5°-5° relative to each other, depending on the strength of the electrode used in relation to the angular radius, wherein adjacently arranged bores 5, 11 overlap one another in some regions. In other words, the straight electrode 10 is poked further and further through the first opening 8 of the first bore 5, at a slightly modified angle, to generate a further bore 11, wherein the depth of the bores 11 extends, as required, in each case beyond the central plane E between the two platform side surfaces 6 and 7. Despite the electrode 10 being inserted at a different angle with respect to the relevant platform side surface, the size of the first opening 8 is widened, albeit only slightly. A partial cavity with the shape of a fan or a segment of a circle shown in FIG. 3 results in this way.

A partial cavity with an analogous or at least very similar shape can alternatively also be obtained by the electrode 10 inserted into the first opening 8 of the first bore 5 being pivoted in a fan-like fashion. The partial cavity created is accordingly not the result of a plurality of individual bores but the result of the electrode 10 being pivoted in the manner of a windshield wiper about the center point of the first opening 8 as a pivot point.

Figure 4:
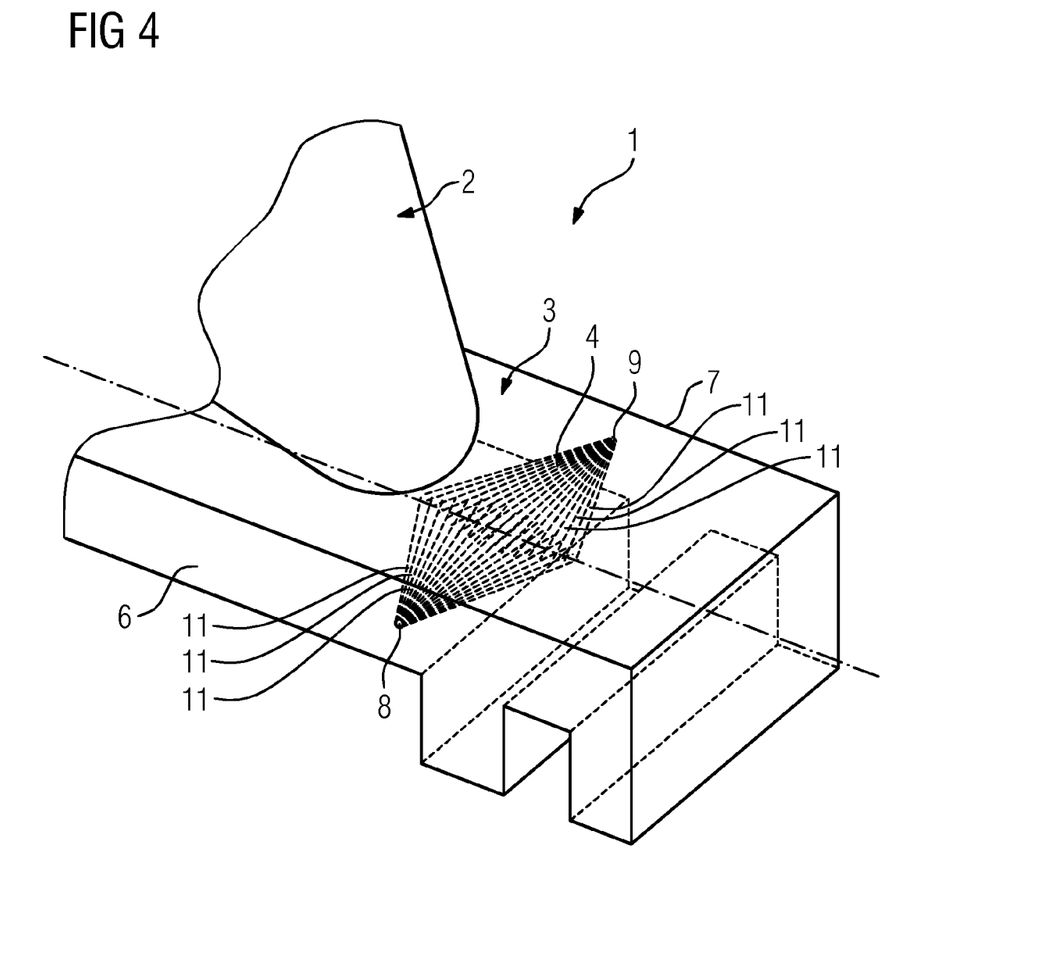
FIG. 4 is a view according to FIGS. 1, 2, and 3 which shows a view after a third method step of the method according to the invention has been performed.
Figure 5:
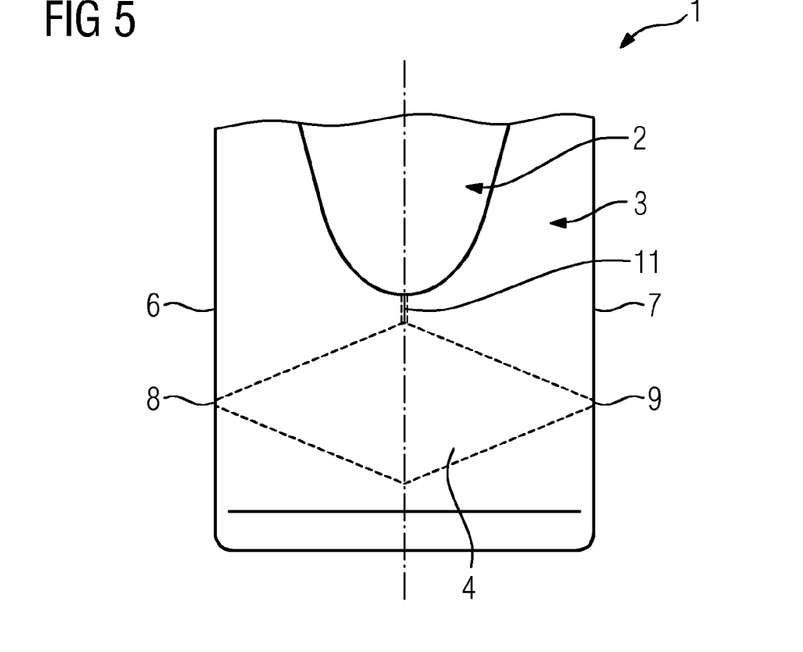
FIG. 5 shows a plan view of the blade platform illustrated in FIG. 4.

In a third step, as shown in FIG. 4 and in a manner analogous to the second step, a further partial cavity is produced starting from the second opening 9 of the first bore 5, i.e. starting from the second platform side surface 7 and to be precise in such a way that the bores 11 of the two partial cavities intersect and the partial cavities overlap one another. In this way, a cavity 4 with an essentially diamond-shaped outer contour is generated overall which is accessible from the outside via the first opening 8 provided on the first platform side surface 6 and the second opening 9 provided on the second platform side surface 7.

The openings 8 and 9 can, as required, be sealed in a following step, in particular by means of soldering or welding. Alternatively, however, they can also remain as cooling fluid outlet openings for cooling the platform side surfaces 6 and 7.

The cavity 4 can be connected to a cavity of the blade leaf 2 via the formation of one or more connecting ducts 12 in order to conduct in particular cooling fluid from inside the blade leaf 2 into the cavity 4 of the blade platform 3 and from there via the openings 8 and 9 to the outside.

The above-described method is characterized in particular in that the two openings 8 and 9, which are generated when the first bore 5 is produced, are not increased significantly during the fan-like widening of the first bore 5. They remain relatively small. After the cavity 4 has been produced, their diameter is advantageously in the region of 1 to 5 mm. Owing to this small size, sealing using a soldering or welding method presents relatively few problems even in the case of a material that is difficult to weld. Also owing to their small size, it is possible to leave the openings 8 and 9 as cooling fluid outlet openings, which would not be conceivable in the case of the method described at the beginning for producing a cavity in a blade platform.

Figure 6:
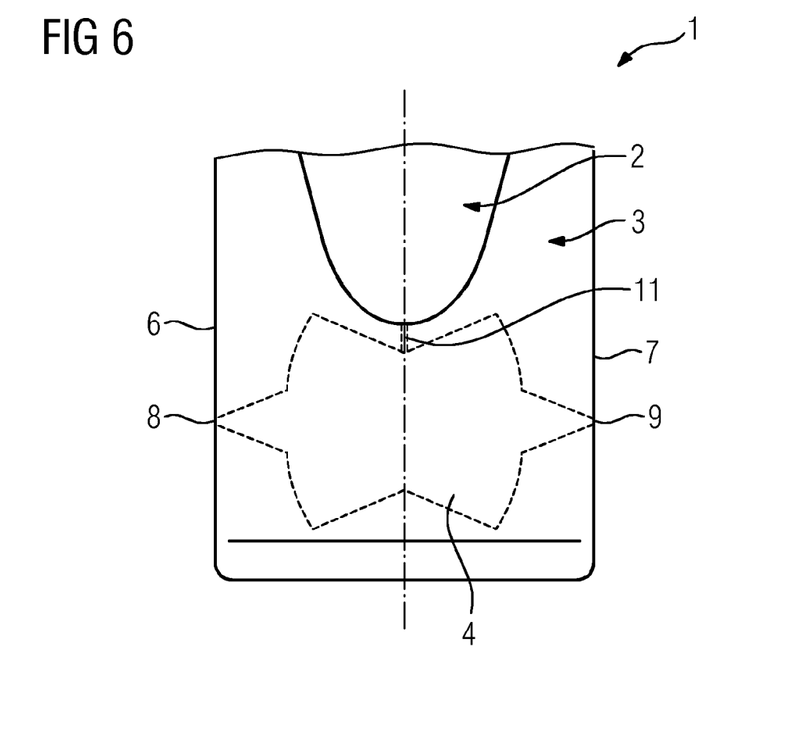
FIG. 6 is a plan view, similar to FIG. 5, which shows an alternative form of a cavity which has been produced using a method according to the invention.

FIG. 6 shows an alternative outer contour of the cavity 4 which can be created when performing the abovementioned method steps. The outer contour of the cavity 4 in FIG. 6 is essentially star-shaped, which can be attributed to the fact that somewhat longer electrodes 10 have been used to widen the first bore 5 compared with FIGS. 3 and 4.

Figure 7:
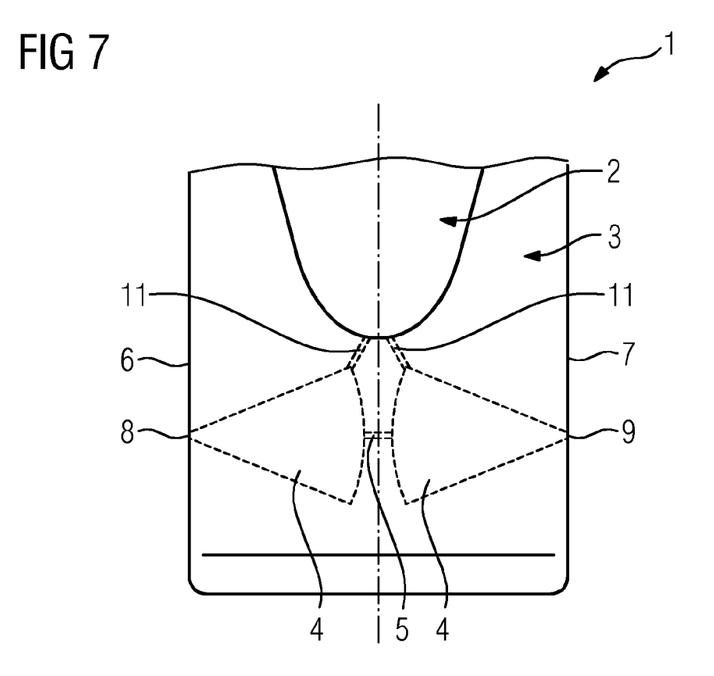
FIG. 7 is a plan view, similar to FIG. 5, which shows a further alternative form of a cavity which has been produced using a method according to the invention.

FIG. 7 shows a further possible outer contour of cavities 4 which have been produced using the method according to the invention. The contours of the cavities 4 are in each case essentially triangular, which can be attributed to the fact that the electrodes 10 used when widening the first bore 5 have been selected to be shorter than half the width B/2 between the platform side surfaces 6 and 7.

It should be pointed out that the first bore 5 does not necessarily have to be configured as a through bore. It is likewise possible, instead of a through first bore 5, to generate in each case an initial bore starting from both the first platform side surface 6 and from the second platform side surface 7 in order to then widen the two bores in a fan-like fashion.

Although the invention has not been illustrated and described in detail by the preferred exemplary embodiment, the invention is not limited by the examples disclosed and other variants can be derived by a person skilled in the art without going beyond the scope of the invention.

The invention claimed is:

1. A method for producing a cavity in a blade platform of a blade, the method comprising:
    a) producing a first bore starting from a first platform side surface in the direction of an opposite second platform side surface, generating a first opening in the first platform side surface, and
    b) widening the first bore in the manner of a fan by a spark erosion method, in such a way that the first opening, generated in step a), of the first bore represents the starting point of a segment of a circle in the form of an arc widening,
    wherein, in step b), starting from the first opening of the first bore, a plurality of further bores are generated which each has a predetermined angular offset with respect to one another, wherein bores adjacently arranged overlap each other in some regions, or
    wherein, in step b), a rigid electrode is inserted into the first opening of the first bore for the spark erosion method and is pivoted in the arc fashion.

2. The method as claimed in claim 1,
    wherein the depth of the first bore and/or the further bores in each case extends beyond an imaginary central plane between the first platform side surface and the second platform side surface.

3. The method as claimed in claim 1,
    wherein a bore is produced which generates a second opening in the first platform side surface and/or in the second platform side surface and which extends, starting from this second opening, toward the opposite platform side surface, and
    wherein the bore is widened in the arc fashion by the spark erosion method, in such a way that the second opening represents the starting point of the arc widening.

4. The method as claimed in claim 3,
    wherein, as part of the arc widening, starting from the second opening generated in the first or second platform side surface, a plurality of further bores are generated which each has a predetermined angular offset relative to one another, wherein adjacently arranged bores overlap one another in some regions, or
    wherein, as part of the arc widening, the rigid electrode is inserted into the bore starting from the second opening for the spark erosion method and is pivoted in the arc fashion.

5. The method as claimed in claim 4,
    wherein the depth of the bore or the further bores in each case extends beyond an imaginary central plane between the second platform side surface and the first platform side surface.

6. The method as claimed in claim 3,
    wherein the arc widening effected by the same or different platform side surface defines a common cavity.

7. The method as claimed in claim 1,
    wherein at least the blade platform is produced from a super alloy, or a nickel-based super alloy.

8. The method of claim 1,
    wherein the blade comprises a turbine blade as part of a blade platform cooling system.

9. The method of claim 1, wherein the spark erosion method comprises using the rigid electrode in the form of a wire or rod.

* * * * *